United States Patent
Neatherway (10) Patent No.: US 9,785,421 B1
(45) Date of Patent: Oct. 10, 2017

(54) EXTERNAL DEPENDENCY ATTRIBUTION

(71) Applicant: SEMMLE LIMITED, Oxford (GB)

(72) Inventor: Robin Neatherway, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/476,578

(22) Filed: Mar. 31, 2017

(51) Int. Cl.
  *G06F 9/44* (2006.01)
  *G06F 9/45* (2006.01)
  *G06F 17/30* (2006.01)

(52) U.S. Cl.
  CPC .......... *G06F 8/433* (2013.01); *G06F 8/77* (2013.01); *G06F 17/30088* (2013.01)

(58) Field of Classification Search
  CPC ................................................ G06F 9/44
  USPC .................. 717/101–103, 130–132
  See application file for complete search history.

(56) References Cited

U.S. PATENT DOCUMENTS

| | | | |
|---|---|---|---|
| 2006/0075335 A1* | 4/2006 | Gloor | G06T 11/206 715/273 |
| 2011/0035601 A1* | 2/2011 | Davidson | G06F 21/14 713/190 |
| 2014/0137074 A1* | 5/2014 | Hey | G06Q 10/063112 717/101 |
| 2017/0090890 A1* | 3/2017 | Hale | G06F 8/443 |

* cited by examiner

*Primary Examiner* — Jae Jeon
(74) *Attorney, Agent, or Firm* — Fish & Richardson P.C.

(57) ABSTRACT

Methods, systems, and apparatus, including computer programs encoded on computer storage media, for attributing external dependencies in a software project. One of the methods includes receiving data representing a child snapshot and a parent snapshot in a revision graph of a software project. One or more pairs of matching source code files is identified, and for each pair having a first file and second file, a first count of external dependencies on an external dependency target in the first file and a second count of external dependencies on the external dependency target in the second file are computed. If the first count is different than the second count, an introduction or a removal of one or more external dependencies on the external dependency target in the second file of the pair of matching source code files is attributed to an author of the child snapshot.

21 Claims, 6 Drawing Sheets

EXTERNAL DEPENDENCY ATTRIBUTION

BACKGROUND

This specification relates to static analysis of computer software source code.

Static analysis refers to techniques for analyzing computer software source code without executing the source code as a computer software program.

A software project, or for brevity, a "project," is a code base having a collection of source code files. A project generally organizes the collection of source code files in a particular way, e.g., in a hierarchical directory structure, with each source code file in the project having a respective path. Typically, the source code files in a project provide one or more related functionalities.

Source code in a project is typically maintained by developers using a version control system. Version control systems generally maintain multiple revisions of the source code in the code base, each revision being referred to as a snapshot. Each snapshot includes the source code of files of the code base as the files existed at a particular point in time.

Snapshots stored in a version control system can be represented as a directed, acyclical revision graph. Each node in the revision graph represents a commit of the source code. A commit represents a snapshot as well as other pertinent information about the snapshot such as the author of the snapshot, and data about ancestor commits of the node in the revision graph. A directed edge from a first node to a second node in the revision graph indicates that a commit represented by the first node is a previous commit than a commit represented by the second node, and that no intervening commits exist in the version control system.

SUMMARY

This specification describes how a system can attribute external dependencies that are introduced into and removed from software projects. After having such attribution data, a system can generate aggregated attribution metrics that provide insight into how external dependencies are being used.

Particular embodiments of the subject matter described in this specification can be implemented so as to realize one or more of the following advantages. A system can attribute the introductions and removals of external dependencies to a software project. From this information, a system can compute which developer entities have the most experience working with which external software modules. This information can be used to direct development efforts and to simplify the code base. A system can determine the external dependencies have been introduced and removed the most often and that have been introduced and removed the fastest within a recent time period. A system can present information about how external dependencies have changed over time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies for attributing the introductions and removals of external dependencies in source code projects, as well several applications for using such data.

In this specification, an "external dependency" is an instance of source code within a project that references a software module that is not part of the project itself. Such a software module may thus be referred to as an external software module. Each external dependency has an external dependency source, which is the source code within the project that references an external software module. Each external dependency also has an external dependency target, which is a set of external software modules. Thus, if source code references an external software module belonging to an external dependency target, the source code can be described as having an external dependency on the external dependency target. Therefore, even if two external dependencies with different external dependency sources reference different portions of an external software module, both external dependencies would be considered to have the same external dependency target. In addition, because the external dependency target is defined as a set, even if two external dependencies reference different versions of an external software module, both external dependencies could still be considered to have the same external dependency target if the different versions both belonged to the same external dependency target.

External dependencies commonly arise from source code that uses functionality provided by external software modules, including libraries, packages, and source code archives, to name just a few examples. Many of the examples below will refer to external dependencies involving the use of external libraries. However, the same techniques can also be used for external dependencies that arise from the use of other kinds of external software modules.

In most situations, developers of a project having external dependencies on an external software module cannot modify the external software module. Therefore, if a problem arises with the external software module, the developers of the project typically face one of the following two options: (1) modify the source code of the external dependency source to use a different, replacement external software module, or (2) duplicate the functionality of the external software module within the project itself. Option 1 introduces uncertainty because it is often unclear whether a suitable replacement exists, how the use of the replacement should actually be implemented, and who should actually carry out the changes necessary to use the replacement. Option 2 introduces inefficiencies in the form of duplicating efforts that have already been expended by others.

The types of source code references that give rise to external dependencies include references to the following externally defined source code elements: calls to externally defined functions, uses of externally defined variables, declaring a variable or a method parameter to have an externally defined type, using an externally defined exception type, use of a field of an externally defined class, and using an externally defined source code annotation, to name just a few examples.

Identifying external dependencies is an important goal for many software engineering tasks. These tasks include simplifying and managing the external software modules that are used by a particular software project. For example, as time goes on, the need to update libraries becomes more important as libraries become out-of-date because out-of-date libraries can introduce various problems including compatibility issues and security vulnerabilities. In addition, it is often advantageous to reduce the number of different versions of a particular library that are used by a project so that maintaining the project is simpler and more efficient. Being able to figure out what external dependencies exist is an important part of these tasks.

Another difficult task with managing external dependencies is understanding how to remove them. It is often unclear which developers on a team have expertise with which external software modules. For example, if eliminating external dependencies on a particular library version is identified as an important goal, a useful piece of information would be a list of developers who have removed external dependencies on that particular library in the past. These developers are people who are likely to know how to safely and efficiently migrate to alternatives, e.g., newer versions of the library.

By providing the ability to attribute the introductions and removals of external dependencies, a static analysis system can generate valuable information for managing external dependencies in a project.

Figure 1:
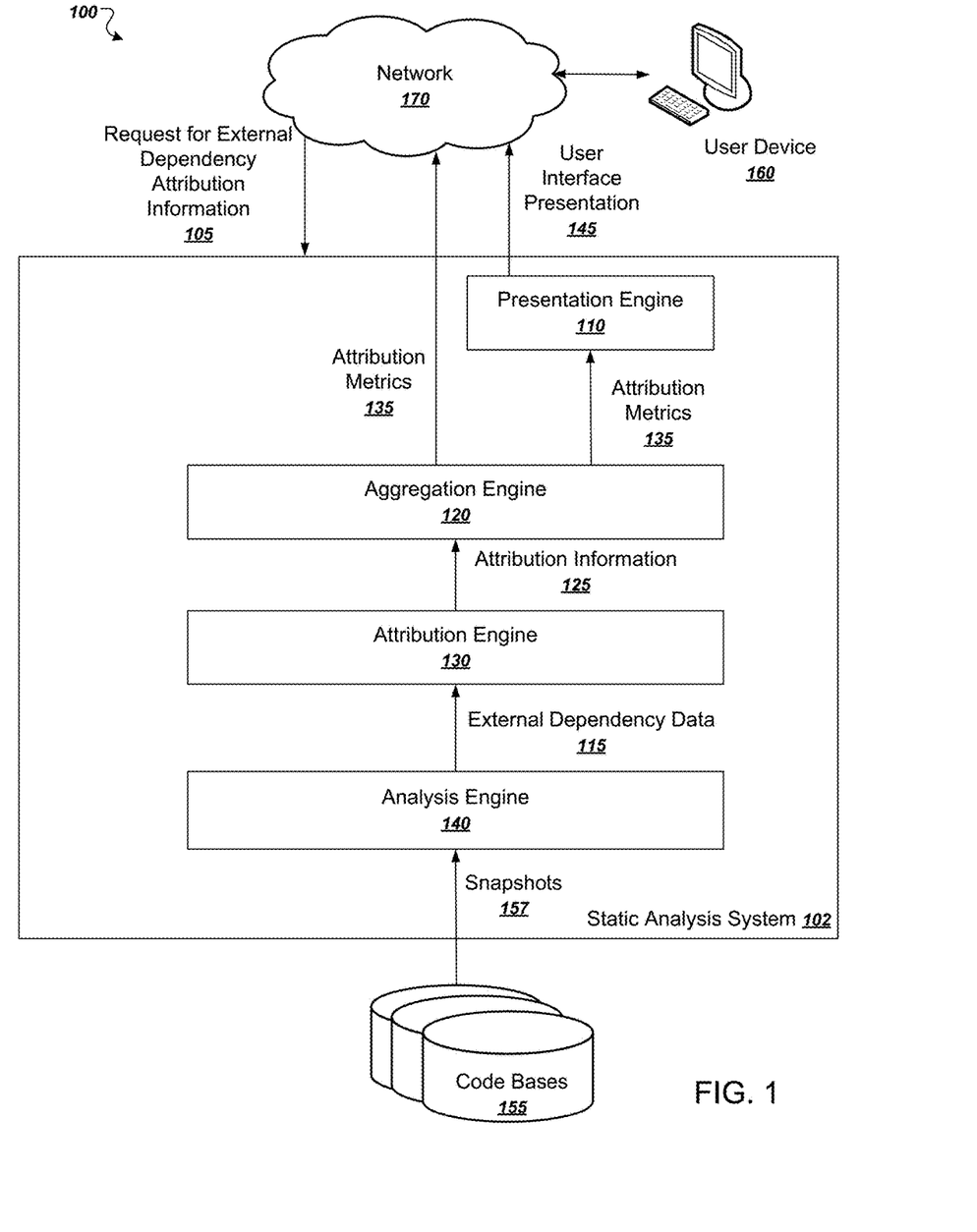
FIG. 1 illustrates an example system.

FIG. 1 illustrates an example system 100. The system 100 includes a user device 160 in communication with a static analysis system 102 over a network 170. The static analysis system 102 includes several functional components, including a presentation engine 110, an aggregation engine 120, an attribution engine 130, and an analysis engine 140. The components of the static analysis system 102 can be implemented as computer programs installed on one or more computers in one or more locations that are coupled to each through a network 170, which can be any appropriate communications network, e.g., an intranet or the Internet. Alternatively, the static analysis system 102 can be installed in whole or in part on the user device 160.

A user of user device 160 can provide to the static analysis system 102 a request for external dependency attribution information 105. The request 105 can specify one or more snapshots of one or more code bases 155 for analysis. For example, the request 105 can identify a subset of snapshots in one or more code bases to analyze only that subset, or the request 105 can identify one or more code bases to analyze all snapshots in the one or more code bases.

Upon receiving the request 105, the analysis engine 140 receives the selected snapshots 157 from the one or more code bases 155.

The analysis engine 140 can then identify external dependencies in the selected snapshots 157. To do so, the analysis engine 140 can resolve all dependencies in source code of the snapshots 157. In other words, the analysis engine 140 can determine where to find the appropriate definitions for each statement of source code in the snapshots 157. The analysis engine 140 can designate, as an external dependency, each statement that requires a software module that is not part of the source code of the code base being analyzed. The analysis engine 140 can identify every external dependency in every snapshot rather than merely identifying listing which external software modules are being used. This means that if a source code file has 10 statements that require an external software module, the analysis engine 140 can identify all 10 statements rather than simply identifying that the external software module is being used.

The analysis engine 140 can generate external dependency data 115 that records various items of information for each statement requiring an external software module in the snapshots 157. The external dependency data 115 can include, for each external dependency, data representing a snapshot in which the external dependency occurs, a location within the snapshot, and an external dependency target identifier. The location can include a file path, a location within a file, or both, of the external dependency source, which is the source code statement that references the external dependency target. The data can also include a snippet of the actual source code of the statement.

The external dependency data 115 can optionally include version information for each software module belonging to the external dependency target, as well as vendor information that identifies a company or a group responsible for distributing the external software module. In addition, the external dependency data 115 can include license information about the particular license attached to the external software module.

The analysis engine 140 can identify source code that introduces external dependencies by using a predefined list of external dependency targets. In other words, the system can receive data representing all external software modules whose external dependencies are to be analyzed and to which external dependency targets each of the external software modules belongs. The data can specify a number of different versions of an external software module considered to belong to the same external dependency target. For example, the data can specify that versions 4.2.1 and 4.2.2 of a particular library should be considered to be the same external dependency target. Alternatively or in addition, the data can specify which subcomponents of a particular external software module should be considered to be the same or different external dependency targets. For example, if an external software module has three subcomponents, two of the subcomponents of the external software module can be defined to belong to the same external dependency target, and a third subcomponent can be defined to belong to a different external dependency target. For each external software module, the data can include an identifier for the external software module, and optionally, a version.

The membership of an external software module to an external dependency target need not be exclusive to any one particular external dependency target. For example, one external dependency target can be all versions of an external library having a version of "4.x," where x is a wildcard character. Another external dependency target can be all versions of the external library. Another external dependency target can be all external libraries of any kind. Therefore, in this example an external library having a version of 4.2 would belong to all three external dependency targets.

The attribution engine 130 receives the external dependency data 115 and attributes external dependency changes between the snapshots 157. The attribution engine 130 can attribute changes in external dependencies between snapshots to a particular developer entity, to a particular snapshot, or both and represent such information as attribution information 125. This process is described in more detail below with reference to FIG. 2.

The aggregation engine 120 receives the attribution information 125 and generates one or more attribution metrics 135. In general, an aggregated attribution metric is an aggregate measure of a particular kind of attribution activity. Aggregated attribution metrics can include a raw count of external dependency introductions. Aggregated attribution metrics can also include a raw count of external dependency removals. Aggregated attribution metrics can also include a net count of external dependency activity, which can be defined as a raw count of external dependency introductions minus a raw count of external dependency removals. For brevity, the net count of external dependency activity may be referred to as net external dependency introductions. Aggregated attribution metrics can also include a sum of external dependency activity, which can be defined as a raw count of external dependency introductions plus a raw count of external dependency removals.

Different attribution metrics can be relevant to different use cases. For example, in order to compute which developer has the most expertise with using a particular library, the system can compute a raw count of external dependency introductions or net external dependency introductions. To compute which developer has the most expertise with removing dependencies on a particular library, the system can compute a raw count of external dependency removals. To compute which developer has the most overall expertise with a particular library, the system can compute a sum of external dependency introductions and external dependency removals.

The static analysis system 102 can provide the attribution metrics 135 back to the user device 160. The static analysis system can also use a presentation engine 110 that generates a user interface presentation 145 from the computed attribution metrics 135. The static analysis system can then provide the user interface presentation 145 to the user device 160 for presentation to a user.

Figure 2:
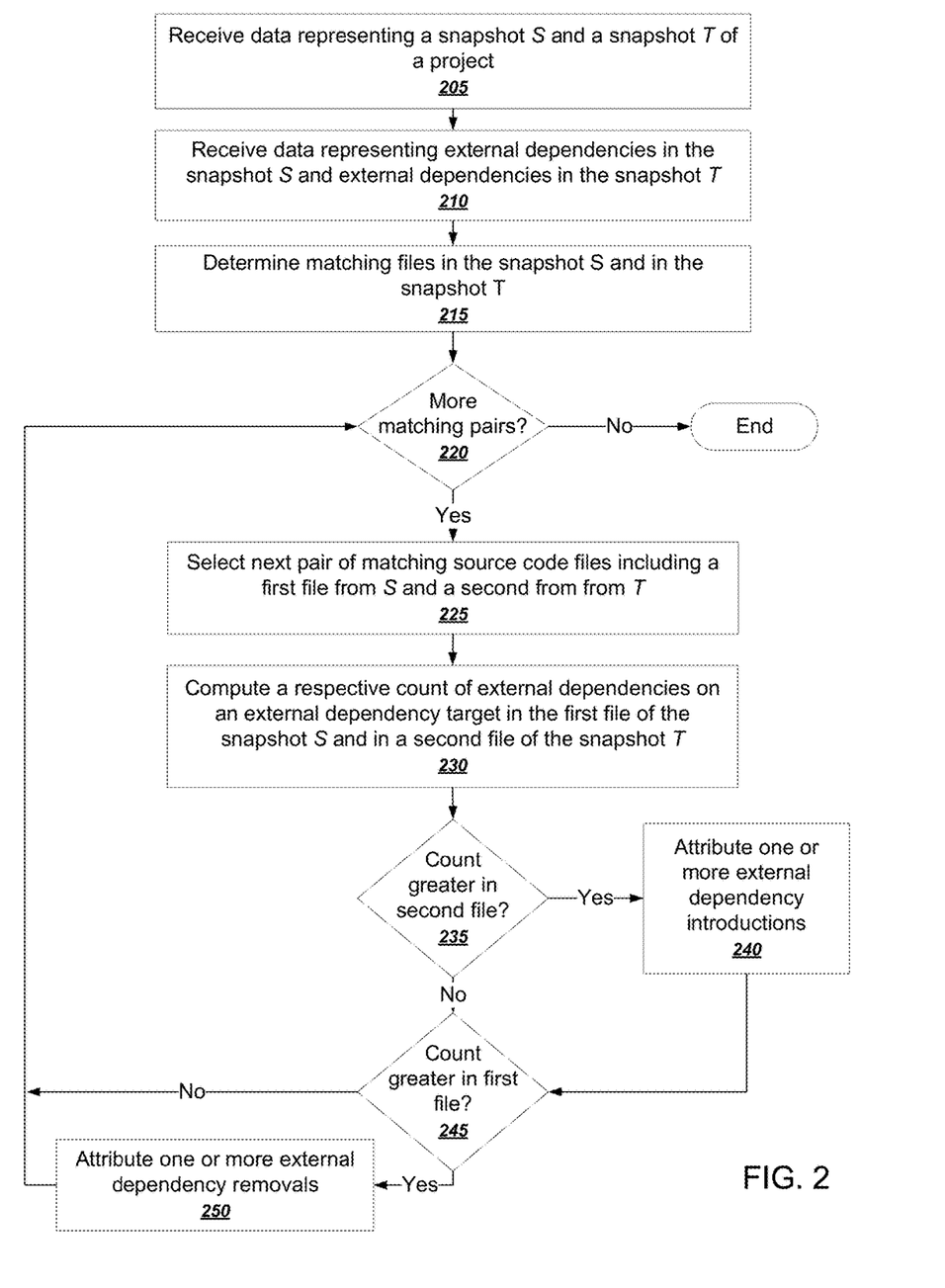
FIG. 2 is a flow chart of an example process for attributing external dependency changes.

FIG. 2 is a flow chart of an example process for attributing external dependency changes. In general, a static analysis system receives data identifying external dependencies in a snapshot S and a snapshot T of a project. The system then counts changes in the external dependency targets between the snapshots in order to attribute external dependency changes. The process can be implemented by one or more computer programs installed on one or more computers. The process will be described as being performed by an appropriately programmed system of one or more computers, e.g., the static analysis system 102 of FIG. 1.

The system receives data representing a snapshot S and a snapshot T of a project (205). The data can include paths of source code files in each snapshot of the project. The data representing the snapshots may, but need not, include all of the actual source code of each snapshot. For example, some snapshot representations can simply include data about what has changed relative to another snapshot. Typically, the snapshot S is a parent snapshot of the snapshot T in a revision graph of a project, although the snapshots need not have any particular relationship according to the revision graph.

The data representing the snapshots can include data about which files of the snapshot S correspond to files of the snapshot T. For example, if some files from the snapshot S were moved to a new directory or simply renamed in the snapshot T, the data can include cross-reference data representing a correspondence of paths for files in the snapshot S and files in the snapshot T. Two files having corresponding paths can be referred to as files having "matching paths." In some implementations, the system by default considers files to be corresponding files if they have matching paths in the snapshot S and in the snapshot T.

The system receives data representing external dependencies in the snapshot S and external dependencies in the snapshot T (210). For example, an analysis engine can resolve all dependencies for all statements in the snapshot S and the snapshot T and determine which of the statements depend on software modules that are members of one or more of the external dependency targets.

The system determines matching files in the snapshot S and in the snapshot T (215). The data representing the snapshots can include data about which files of the snapshot S correspond to files of the snapshot T. For example, if some files from the snapshot S were moved to a new directory or simply renamed in the snapshot T, the data can include cross-reference data representing a correspondence of paths for files in the snapshot S and files in the snapshot T. Two files having corresponding paths can be referred to as files having "matching paths." In some implementations, the system by default considers files to correspond if they have a same path in the snapshot S and in the snapshot T.

The system determines whether there are more matching files to be processed (220).

If so, the system selects a next pair of matching source code files including a first file from the snapshot S and a second file from the snapshot T (branch to 225).

The system computes a respective count of external dependencies on an external dependency target in the first file from the snapshot S and in the second file from the snapshot T (230). The system can analyze the source code of the project and identify all external dependencies and respective external dependency targets associated with each external dependency. The system can increment a count for an external dependency target any time an external dependency references an external software module belonging to the external dependency target.

The system next determines whether the count of external dependencies for the external dependency target has changed between the first file in the snapshot S and the second file in the snapshot T. If the count of external dependencies for the external dependency target has changed, the system attributes one or more external dependency introductions, one or more external dependency removals, or both. An external dependency introduction is the introduction in the source code of an external dependency on the external dependency target. An external dependency removal is the removal from the source code of an external dependency on the external dependency target. The system can attribute the external dependency changes to an author of the snapshot T, to the snapshot T itself, or both.

If the count has increased between the file first in the snapshot S and the second file in the snapshot T (235), the system attributes one or more external dependency introductions (branch to 240). In this situation, the author of the snapshot T made changes to the second source code in the snapshot T that introduced external dependencies on the external dependency target. Therefore, the system can attribute one or more external dependency introductions. In some implementations, the system attributes a introduction of a number of external dependencies defined by the increase in the count. For example, if the second file in the snapshot T includes two more external dependencies on the external dependency target than the first file in the snapshot S, the system can attribute two external dependency introductions.

On the other hand, if the count of external dependencies on the external dependency target has decreased between the first file in the snapshot S and the second file in the snapshot T (245), the system attributes one or more external dependency removals (branch to 250). In this situation, the author of the snapshot T made changes to the source code in the second file in the snapshot T that removed external dependencies on the external dependency target. Therefore, the system can attribute one or more external dependency removals. In some implementations, the system attributes a removal of a number of external dependencies defined by the decrease in the count. For example, if the snapshot T includes two fewer external dependencies on the external dependency target than the snapshot S, the system can attribute two external dependency removals.

In many cases, the source code changes that introduce external dependencies are due to a developer adding source code that references modules belonging to the external dependency target or modifying source code so that it newly references modules belonging to the external dependency target. Similarly, the source code changes that remove external dependencies are often due to a developer removing or modifying lines of source code so that the source code no longer references modules belonging to the external dependency target. However, external dependencies can also be introduced or removed by other types of changes.

To illustrate one such situation, consider two externally defined software modules that have similar names. For example, there are many different software libraries that provide logging functionality. Therefore, two different external software modules may both define a class named "Logger." Each reference to the "Logger" class within source code of a snapshot is thus an external dependency on whichever external software module defines the class. An import statement at the top of a source code file can indicate which of the two external software modules is being used to define the "Logger" class.

If a developer changes the import statement so that it references a different external software module defining the "Logger" class, all external dependencies due to references to the "Logger" class in the source code file will change. In particular, all previous external dependencies on the first external software module can be counted as external dependency removals, and all references to the "Logger" class within the file can be counted as external dependency introductions. Therefore, the system can attribute, to a developer changing just one import statement, one or more external dependency introductions, one or more external dependency removals, or both.

If the count is the same between the first file in the snapshot S and the second file in the snapshot T, the system does not attribute any external dependency changes. Although FIG. 2 illustrates step 240 occurring before step 250, this ordering can also be reversed or both steps can happen concurrently and in parallel.

The system then again determines whether there are more unprocessed matching pairs of files (220). If so, the system selects a next matching pair (branch to 225). If not, the process ends (branch to end).

Figure 3:
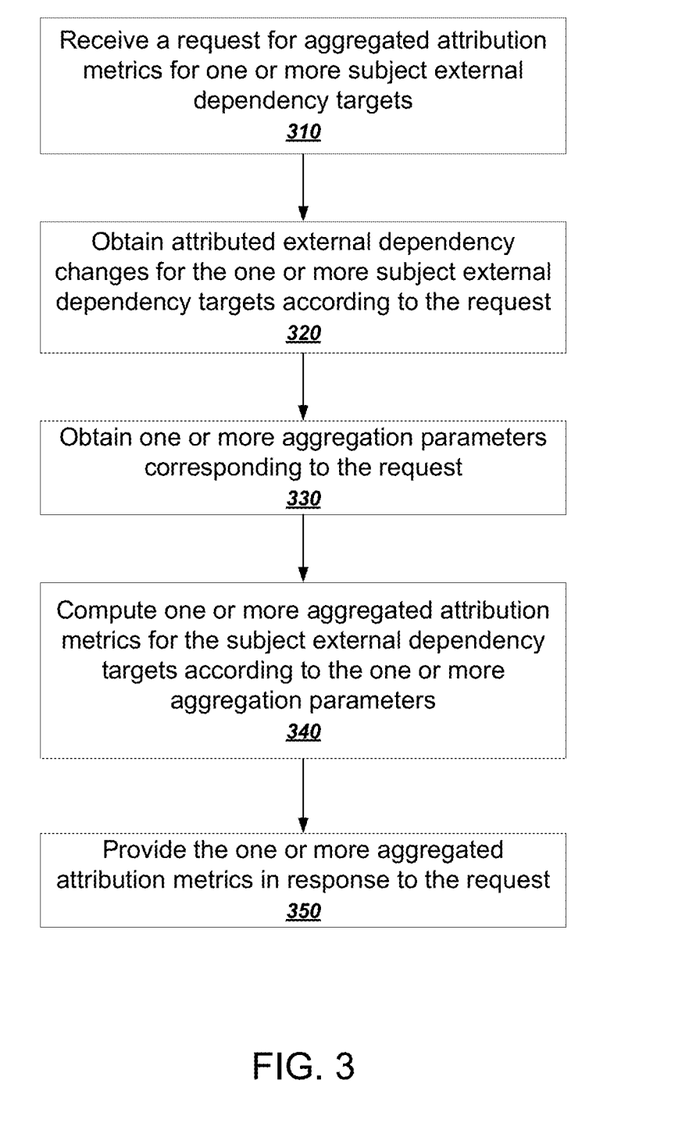
FIG. 3 is a flow chart of an example process for aggregating attribution metrics for an external dependency target.

FIG. 3 is a flow chart of an example process for aggregating attribution metrics for an external dependency target. After computing attribution information for external dependencies, the system can compute aggregated attribution metrics for a variety of use cases. The process will be described as being performed by an appropriately programmed system of one or more computers, e.g., the static analysis system 102 of FIG. 1.

The system receives a request for aggregated attribution metrics for one or more subject external dependency targets (310). The request can specify a number of subject external dependency targets as well as the external software modules that belong to each of the subject external dependency targets.

The request may specify one or more attribution metrics explicitly or implicitly. For example, if the request is a request to compute which developer has the most experience with software modules of a particular external dependency target, the system can interpret the request to be a request for a sum of external dependency activity. In some implementations, the system maintains a mapping between different types of requests that are supported by the system and the associated attribution metrics that correspond to those requests.

The system obtains attributed external dependency changes for the one or more subject external dependency target according to the request (320). For example, using the process as described above with reference to FIG. 2, the system can identify introductions, removals, or both, of external dependencies on the one or more subject external dependency targets and attribute the external dependency changes to respective snapshot authors, respective snapshots, or both. The system need not attribute the external dependency changes inline, e.g., after the request is received. In some implementations, the system can attribute the external dependency changes offline, e.g., before the request is received.

The request may specify explicitly or implicitly which types of changes should be attributed, e.g., introductions, removals, or both. For example, if the request is a request to compute which developer has the most experience with removing dependencies, the system can interpret the request to implicitly specify external dependency removals. Therefore, the system need not attribute introductions.

The system obtains one or more aggregation parameters corresponding to the request (330). The one or more aggregation parameters specify how the attribution metrics should be aggregated. The aggregation parameter can specify aggregating the attribution metrics by developer entity, by project, by time period, by external dependency metadata, or some combination of these.

A developer entity can be a single developer or a group of multiple developers. For example, a developer entity can be developers on a team, developers within a department of an organization, or any other appropriate group of developers. The one or more of the aggregation parameters can define the developer entities explicitly or implicitly. In addition, the aggregation parameters can define the developer entities by specifying values for one or more developer attributes. For example, the one or more aggregation parameters can specify that all developers in a particular location, all developers assigned to a particular team, or all developers who work for a particular company should be grouped into the same developer entity.

To aggregate by developer entity, the system can compute, for each of the subject external dependency targets, aggregated attribution metrics for each developer entity. An example result for aggregation by developer entity is that developer A introduced 10 external dependencies on a particular library, developer B introduced 5 external dependencies on the particular library, and developer C introduced 2 external dependencies on the particular library.

To aggregate by project, the system can compute, for each of a plurality of projects, aggregated attribution metrics for snapshots belonging to the project. An example result for aggregation by project is that project A introduced 10 external dependencies on a particular library, project B introduced 5 external dependencies on a particular library, and project C introduced 2 external dependencies on a particular library.

To aggregate by time periods, the system can compute, for each of a plurality of time period, aggregated attribution metrics for snapshots that were committed within each time period. An example result for aggregation by time period is that in a first month, a project introduced 10 net external dependency introductions; in a second month, the project introduced 5 net external dependency introductions; and in a third month, the project introduced 3 net external dependency introductions.

To aggregate by other metadata, the system can compute, for all external dependency targets having particular metadata, aggregated attribution metrics. An example result for aggregation by external dependency metadata is a number of introductions or removals of external dependencies for targets having a particular license. For example, an organization may want to eliminate or reduce external dependencies on software modules having undesirable license terms. Therefore, to that goal the organization can use the aggregated attribution metrics to gain insights into the introductions and removals of external dependencies for targets having the license in question. Another example result for aggregation by external dependency metadata is a number of introductions or removals of external dependencies for targets having a known vulnerability. For example, an organization may want to eliminate or reduce external dependencies on software modules having a known vulnerability. Thus, the organization can use the aggregated attribution metrics to gain insights into the introductions and removals of external dependencies for targets having known vulnerabilities.

The system can also use any appropriate combination of these. For example, if aggregating by time period, the system can also aggregate by developer entity within each time period. In other words, instead of giving overall attribution metrics for developer entities, the attribution metrics are computed only for one particular time period. As another example, the system can aggregate by developer entity and by project to give attribution metrics per developer and project. As another example, the system can aggregate by time period and by project to compute attribution metrics for each project over multiple time periods. And the system can also aggregate by all three to compute attribution metrics for each project and each developer over each of multiple time periods.

The request can specify the aggregation parameters explicitly or implicitly. For example, the system can implicitly determine the aggregation parameter from the type of request. In some implementations, the system maintains a mapping between different types of requests that are supported by the system and the associated aggregation parameters that correspond to those requests.

The system computes one or more aggregated attribution metrics for the subject external dependency targets according to the one or more aggregation parameters (340).

A first example use case is to determine which developer entities are experts for a particular external dependency target. For this example, the system can use a developer entity aggregation parameter to compute an aggregated attribution metric for each developer entity for each subject external dependency target. The actual attribution metric can be a raw count of external dependency introductions, a net count of external dependency introductions, or a sum of external dependency activity. The system can thus compute the relevant attribution metric for each external dependency target and each developer entity.

A second example use case is to determine which developer entities are experts at removing dependencies. For this example, the system can use a developer entity aggregation parameter and a raw count of external dependency removals as the attribution metric. The system can thus compute the attribution metric for each external dependency target and each developer entity.

To illustrate one example, the system or a user may discover a security vulnerability in an external software module, or may simply decide that the external software module should be phased out. The system can then use the external software module as a subject external dependency target, a developer entity aggregation parameter, and a raw count of external dependency removals as the attribution metric. The system can compute a ranking of developers who have racked up the most removals of external dependencies on the problematic external software module. The system can then suggest a top-ranked developer as a person who should handle the task of removing dependencies to the problematic external software module.

A third example use case is to determine how external dependencies have changed over time for one or more projects. For this example, the system can use a time period aggregation parameter and any appropriate attribution metric. Raw and net counts of external dependency introductions will indicate how quickly external dependencies are being added, while raw counts of external dependency removals will indicate how quickly external dependencies are being removed. The sum of external dependency activity will indicate how often developers are dealing with particular external dependency targets. High levels of activity can reveal a bug, a security vulnerability, or a migration issue, all of which may be concerning use of resources on a development team.

A fourth example use case is to determine which projects use which external dependencies. For this example, the system can use a project aggregation parameter. For the attribution metric, the system can use a raw or net count of external dependency introductions or a sum of external dependency activity. This use case can be valuable for large organizations that manage many code bases. It can be useful to know which projects are using which external dependencies. This information can be used to indicate which projects should start migrating to other external dependencies. This information can also be used to indicate which external software modules should be removed entirely. This process is described in more detail below with reference to FIG. 5.

The system provides the one or more aggregated attribution metrics in response to the request (350). The system can provide the aggregated attribution metrics in a format that is appropriate for the use case involved.

For example, the request can be a request for a ranking based on the aggregated attribution metrics. In response to the request, the system can rank developers, projects, external dependency targets, or time periods, according to the computed attribution metrics and provide one or more highest-ranking elements. For example, if the use case is developers who have introduced the most external dependencies on a particular library, the system can rank all developers who have contributed to a project according to their attribution metrics for that particular library and provide the entire ranking or a subset of the ranking. When aggregating over multiple time periods, the system can provide multiple rankings, one for each time period.

Figure 4A:
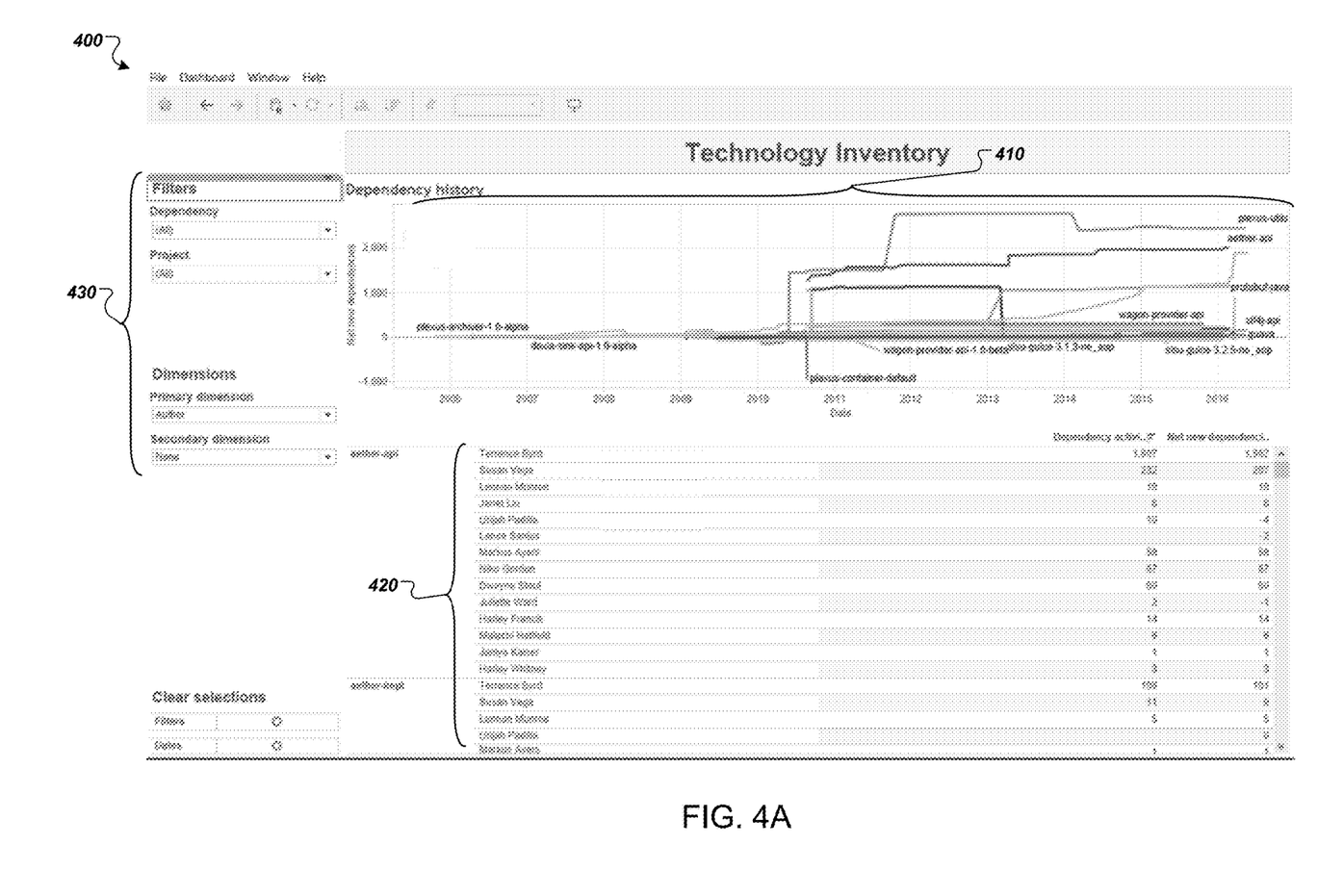
FIG. 4A is a diagram of an example user interface presentation.

FIG. 4A is a diagram of an example user interface presentation 400. The user interface presentation 400 is an example of using aggregated attribution metrics for external dependencies. In this example, the presentation 400 has been generated for a single project.

The presentation 400 includes a line graph 410 that shows how the net external dependency introductions changes over time. The line graph 410 includes a different line for each of several subject external dependency targets.

The line graph 410 reveals that the value for net external dependency introductions is near zero for most of the external dependency targets. This can mean that developers of the project are not adding many new external dependencies for those external dependency targets. A few other external dependency targets continue to have high positive net external dependency introductions. This can be normal, for example, if the project closely depends on the functionality provided by an external software module. However, this may instead be a cause for concern or further investigation.

The line graph 410 also reveals that another external dependency had a downward and negative spike in net external dependency introductions. This can mean that many external dependencies were removed for that particular external dependency target in a short amount of time. This can indicate that an external software module was phased out for another one or was replaced with a native implementation.

The presentation 400 also includes a ranking 420 for one or more particular external dependency targets and one or more time periods. The ranking 420 shows a number of individual developer, and for each developer a number of net external dependency introductions attributed to that developer. The developers in the ranking 420 can be ranked by any of the attribution metrics or another way, e.g., by churn or net new lines of coded added by that developer.

In some implementations, the presentation 400 is an interactive presentation. For example, by selecting any of the lines in the line graph 410 within any of the presented time periods, the system can update the ranking 420. In other words, the system can update the ranking 420 to reflect the corresponding selected external dependency target as well as attribution metrics for the selected external dependency target.

The presentation 400 can also allow a user to select one or more time periods for a selected external dependency target. For example, the user can make a selection action, e.g., a mouse click or a touchscreen touch, within a particular time period to select that time period. The presentation 400 can alternatively or in addition allow a user to drag and drop to select a particular time period. After receiving the user selection of one or more time periods, the system can then update the ranking 420 to reflect the attribution metrics for the selected external dependency target within the one or more selected time periods.

The presentation 400 also includes a number of user interface elements 430 that allow the user to specify which external dependency targets for which projects should be presented. The user interface elements 430 also allow a user to specify how the attribution metrics are to be computed. For example, the system can use the user interface elements 430 to select any appropriate combination of aggregation parameters, e.g., developer entity, time period, project, or some combination of these. The system can update the line graph 410 and the ranking 420 in response to a user selecting any of the user interface elements 430.

Figure 4B:
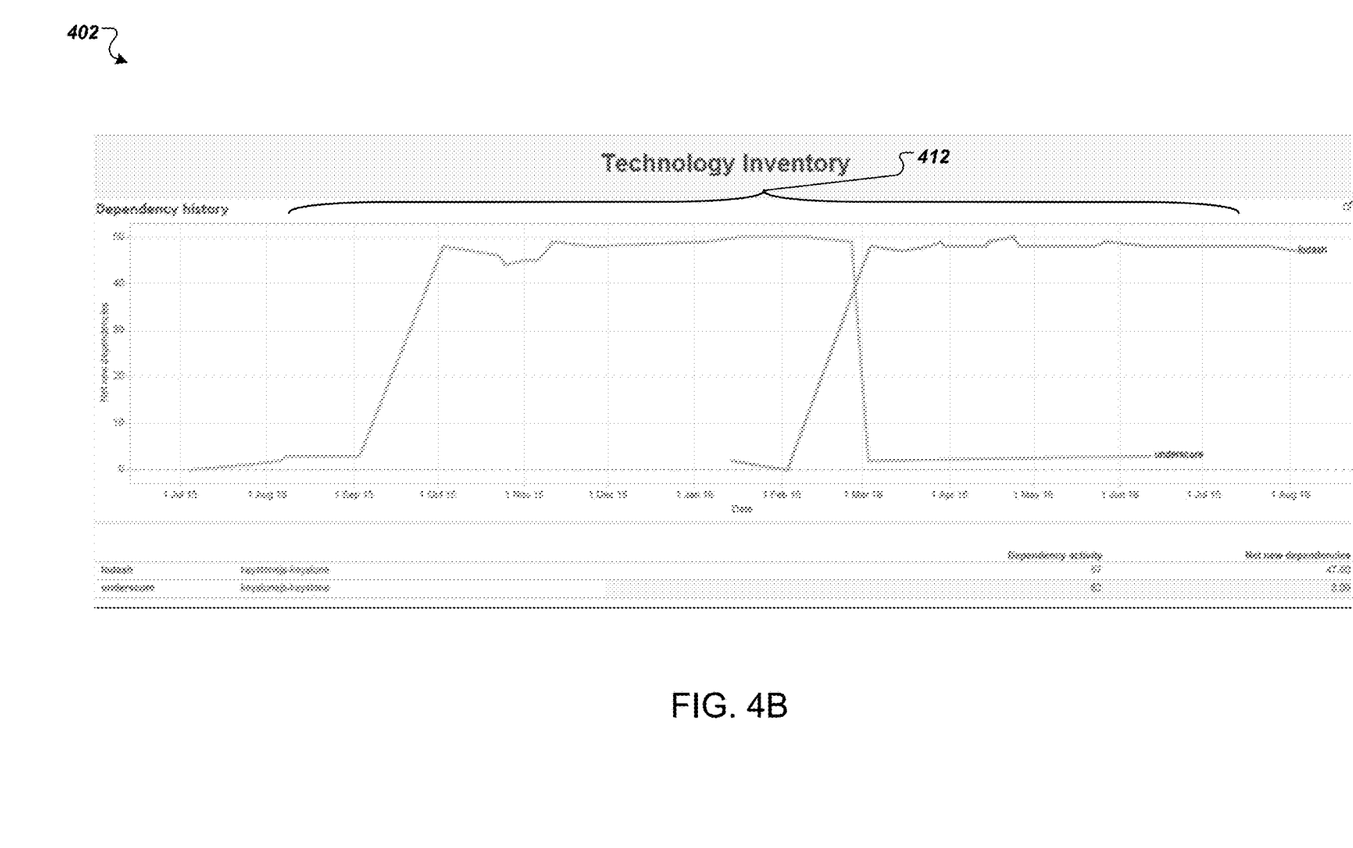
FIG. 4B is a diagram of another example user interface presentation.

FIG. 4B is a diagram of another example user interface presentation 402. The user interface presentation 402 is an example of using aggregated attribution metrics to reveal the history of external dependencies. In this example, the presentation 402 has been generated for two external dependency targets in a single project.

The presentation 402 includes a line graph 412 that shows how the net external dependency introductions changes over time for the two external dependency targets. The line graph 412 includes a different line for each of the external dependency targets.

From the line graph 412, it is apparent that this project swapped out one external software module for another and when this occurred. In this case, between February and March, the module "underscore" was swapped out for another module, "lodash." The user interface presentation also presents values for net new dependencies in this time period as well as a sum of external dependency activity for each target.

This information allows developers of the project to immediately recognize how the external software modules in the project are changing.

Figure 5:
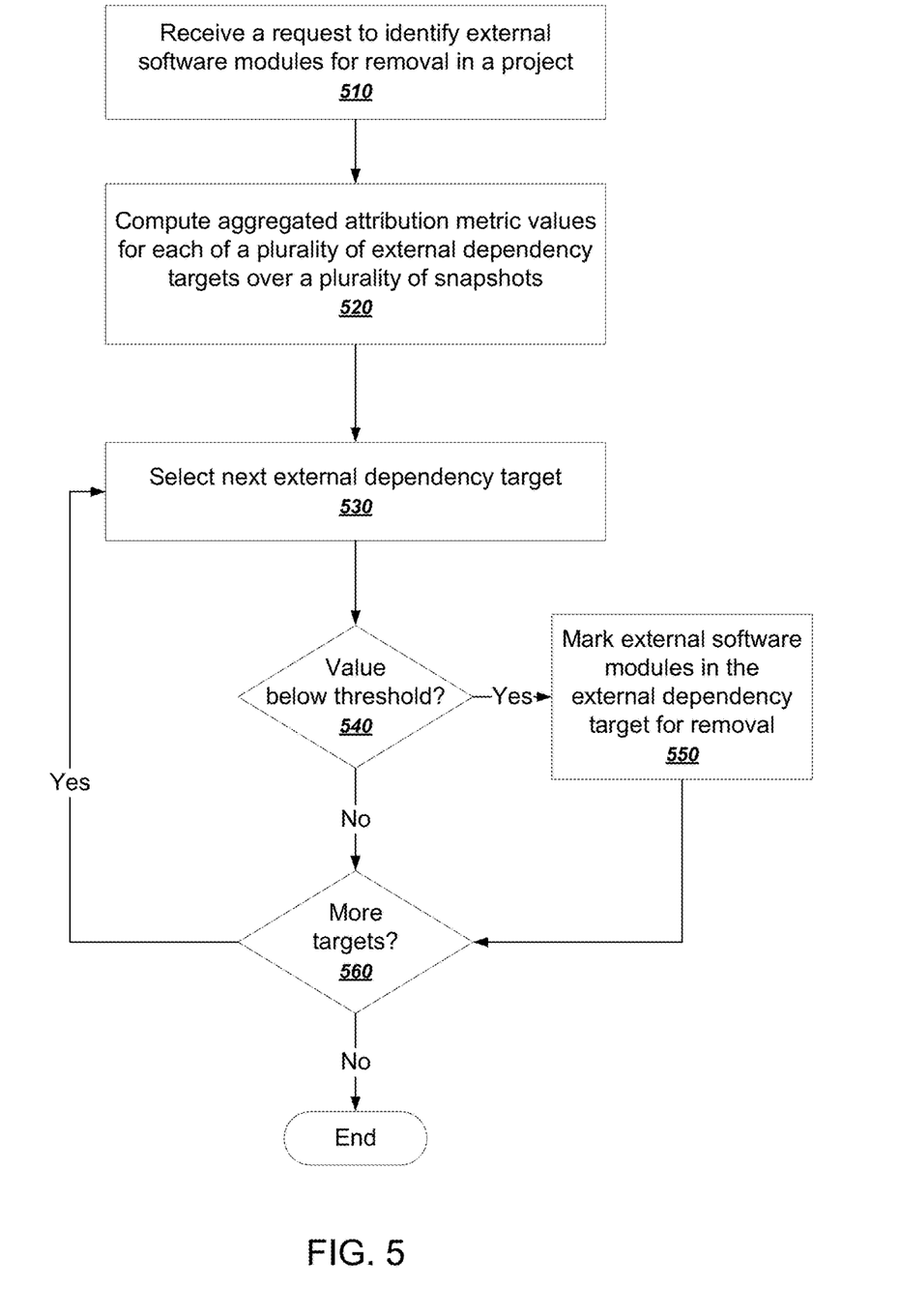
FIG. 5 is a flow chart of an example process for using external dependency changes to identify external dependencies that should be removed from a project.

FIG. 5 is a flow chart of an example process for using external dependency changes to identify external dependencies that should be removed from a project. In general, the system will compute external dependency targets that have sufficiently low net external dependency introductions. This can be a sign that the project is rapidly moving from a particular external software module, which can be due to a security vulnerability or another urgent issue. In such situations, once such external dependency targets are detected, it can be advantageous to automatically mandate the removal of such problematic software modules. The process will be described as being performed by an appropriately programmed system of one or more computers, e.g., the static analysis system 102 of FIG. 1.

The system receives a request to identify external software modules for removal in a project (510). The request can implicitly request analyzing all external software modules that are used by a project. Or the request can explicitly specify one or more external software modules to be analyzed.

The system can also use non-attribution criteria to select an initial set of external software modules to analyze. For example, the system can determine which external software modules have a low absolute number of external dependencies in one or more projects, external software modules that have had an internal release requiring other projects to upgrade, or external software modules having a known vulnerability.

The system computes respective aggregated attribution metric values for each of a plurality of external dependency targets over a plurality of snapshots (520). The system can use a predefined list of external dependency targets or define a new list of external dependency targets that each of one of the external software modules identified by the request. For each of the external dependency targets, the system can compute a respective aggregated attribution metric, e.g., net external dependency introductions, In this example, the system need not attribute the external dependency changes at all. Rather, the system can simply compute a running sum of external dependency changes for each of the external dependency targets. Alternatively, the system can attribute the external dependency changes to snapshots in which the changes occur rather than developers. This is because the values of the attribution metrics themselves inform whether or not the usage of a particular external software module is negative or declining.

In some implementations, the system uses only a recent time period for computing the values for the aggregated attribution metric. The request can thus explicitly specify a recent time period, or the system can use a default value, e.g., the last week, month, or year.

The system selects a next external dependency target (530). After computing the aggregated attribution metric, the system can separately consider each external dependency.

The system then determines whether the value for the aggregated attribution metric is below a threshold (540). Generally, if a project is rapidly moving away from an external software module, its value for the aggregated attribution metric will reflect that. For example, the value for net external dependency introductions may be negative, and more typically, may be a large negative value. Thus, the system can use zero or another negative value as the threshold.

If the value is below the threshold (540), the system marks external software modules in the external dependency target for removal (branch to 550). In other words, the system automatically designates all external software modules of the external dependency target as software modules whose use the project should eliminate. Such information can be forwarded to a development team to carry out removing the use of the external software modules. Alternatively or in addition, the system can automatically delete the external software modules. Thus, further attempts to use the external software modules will actually result in build errors.

The system determines whether more external dependency targets remain (560). If so, the system selects a next external dependency target (branch to 530). If not, the process ends (branch to end).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving data representing a child snapshot and a parent snapshot in a revision graph of a software project;
identifying one or more pairs of matching source code files, each pair including a first file of the parent snapshot and a second file of the child snapshot;
for each first file and second file of each pair of matching source code files:
computing a first count of external dependencies on an external dependency target in the first file and a second count of external dependencies on the external dependency target in the second file;
determining whether the first count of external dependencies on the external dependency target in the child snapshot is different than the second count of external dependencies on the external dependency target in the parent snapshot; and
whenever the first count of external dependencies on the external dependency target in the child snapshot is different than the second count of external dependencies on the external dependency target in the parent snapshot, attributing, to an author of the child snapshot, an introduction or a removal of one or more external dependencies on the external dependency target in the second file of the pair of matching source code files.

Embodiment 2 is the method of embodiment 1, wherein attributing the introduction or removal of one or more external dependencies on the external dependency target to an author of the child snapshot comprises:
attributing, to the author of the child snapshot, an introduction of one or more external dependencies on the external dependency target whenever the first court of external dependencies on the external dependency target in the child snapshot is greater than the second count of external dependencies on the external dependency target in the parent snapshot.

Embodiment 3 is the method of any one of embodiments 1-2, wherein attributing the introduction or removal of one or more external dependencies on the external dependency target to an author of the child snapshot comprises:
attributing, to the author of the child snapshot, a removal of one or more external dependencies on the external dependency target whenever the first court of external dependencies on the external dependency target in the child snapshot is less than the second count of external dependencies on the external dependency target in the parent snapshot.

Embodiment 4 is the method of any one of embodiments 1-3, wherein the external dependency target comprises a plurality of different external software modules.

Embodiment 5 is the method of any one of embodiments 1-4, further comprising:
computing, for each of a plurality of developers who contributed software to the software project, respective values for an attribution metric, wherein the attribution metric is a raw count of external dependency introductions, a raw count of external dependency removals, a net count of external dependency introductions, or a sum of external dependency activity for the external dependency target.

Embodiment 6 is the method of embodiment 5, further comprising:
generating a ranking of the plurality of developers according to the respective values for the attribution metric.

Embodiment 7 is the method of any one of embodiments 1-6, further comprising:

receiving an indication of an external software module that should be removed from the project;

computing, for each of a plurality of developers, a raw count of external dependency removals for the external software module; and ranking each of the plurality of developers based on the raw count of external dependency removals for the external software module.

Embodiment 8 is a method comprising:

receiving a request for aggregated attribution metrics for one or more subject external dependency targets in a project, wherein each external dependency target is a set comprising one or more external software modules;

obtaining attributed external dependency changes for the one or more subject external dependency targets according to the request, wherein each attributed external dependency change identifies a snapshot or an author of a snapshot in which an external dependency in source code of the project was added or removed;

obtaining one or more aggregation parameters corresponding to the request;

computing one or more aggregated attribution metrics for the subject external dependency targets according to the one or more aggregation parameters; and providing the one or more aggregated attribution metrics in response to the request.

Embodiment 9 is the method of embodiment 8, wherein the request is a request to compute a developer entity having the most experience with external dependencies on a particular external software module, wherein obtaining the one or more aggregation parameters comprises obtaining a developer entity aggregation parameter, and wherein computing the one or more aggregated attribution metrics comprises computing a respective raw count of external dependency introductions or a net count of external dependency introductions for the particular external software module for each developer entity of a plurality of developer entities.

Embodiment 10 is the method of any one of embodiments 8-9, wherein the request is a request to compute a developer entity having the most experience with removing external dependencies on a particular external software module, wherein obtaining the one or more aggregation parameters comprises obtaining a developer entity aggregation parameter, and wherein computing the one or more aggregated attribution metrics comprises computing a respective raw count of external dependency removals for each developer entity of a plurality of developer entities.

Embodiment 11 is the method of any one of embodiments 8-10, wherein the request is a request to track external dependencies over multiple time periods, wherein obtaining the one or more aggregation parameters comprises obtaining a time period aggregation parameter, and wherein computing the one or more aggregated attribution metrics comprises computing, for each of the multiple time periods, a respective value for the one or more aggregated attribution metrics.

Embodiment 12 is the method of any one of embodiments 8-11, wherein the request is a request to determine which projects of a plurality of projects use which external dependencies, wherein obtaining the one or more aggregation parameters comprising obtaining a project aggregation parameter, and wherein computing the one or more aggregated attribution metrics comprises computing a respective value for an attribution metric for each project of the plurality of projects.

Embodiment 13 is the method of any one of embodiments 8-12, further comprising:

generating a user interface presentation that presents respective values over time for an attribution metric for a plurality of external software modules.

Embodiment 14 is the method of embodiment 13, further comprising:

receiving a user selection of a particular external software module;

obtaining a ranking of developer entities for the particular external software module according to one or more of the aggregated attribution metrics; and displaying within the user interface presentation one or more highest-ranked developer entities for the particular external software module.

Embodiment 15 is a method comprising:

receiving a request to automatically mark one or more external software modules used in a project for removal;

computing a respective value for net external dependency introductions for external software module each of the one or more external software modules, including, for each pair of snapshots that are adjacent of a plurality of snapshots in a revision graph of the project:

computing a first count of external dependencies on the external software module in a first snapshot of the pair of snapshots,     computing a second count of external dependencies on the external software module in a second snapshot of the pair of snapshots,     adding a difference between the first count and the second count to the respective value for net external dependency introductions for the external software module;

determining that the computed value for net external dependency introductions for a particular external software module is below a threshold; and in response, marking the particular external software module for removal from the project.

Embodiment 16 is the method of embodiment 15, further comprising automatically deleting the external software module.

Embodiment 17 is the method of any one of embodiments 15-16, wherein the threshold is zero or a negative value.

Embodiment 18 is the method of any one of embodiments 15-17, further comprising:

selecting the plurality of snapshots to be snapshots that were committed during a recent time period.

Embodiment 19 is a system comprising: one or more computers and one or more storage devices storing instructions that are operable, when executed by the one or more computers, to cause the one or more computers to perform the method of any one of embodiments 1 to 18.

Embodiment 20 is a computer storage medium encoded with a computer program, the program comprising instructions that are operable, when executed by data processing apparatus, to cause the data processing apparatus to perform the method of any one of embodiments 1 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
   receiving data representing a plurality of snapshots of a software project;
   receiving data representing a plurality of external dependency targets, each external dependency target being a target of one or more external dependencies occurring in one or more of the plurality of snapshots of the software project;
   processing each pair of snapshots of the plurality of snapshots that have a parent/child relationship in a revision graph of the software project, each pair of snapshots having a child snapshot and a parent snapshot, including, for each child snapshot and each parent snapshot of each pair of snapshots, performing operations comprising:
      identifying one or more pairs of matching source code files, each pair of matching source code files including a first file of the parent snapshot and a second file of the child snapshot;
      for each first file and each second file of each pair of matching source code files, and for each external dependency target of the plurality of external dependency targets:
         computing a respective first count of external dependencies on the external dependency target in the first file and a respective second count of external dependencies on the external dependency target in the second file;
         determining whether the first count of external dependencies on the external dependency target in the child snapshot is different than the second count of external dependencies on the external dependency target in the parent snapshot; and
         whenever the first count of external dependencies on the external dependency target in the child snapshot is different than the second count of external dependencies on the external dependency target in the parent snapshot, attributing, to a developer entity responsible for of the child snapshot, an external dependency introduction or an external dependency removal of one or more external dependencies on the external dependency target in the second file of the pair of matching source code files;
   computing, for each external dependency target of the plurality of external dependency targets for each of multiple time periods, a respective value of an aggregated external dependency attribution metric based on attributed external dependency introductions, attributed external dependency removals, or both, for the external dependency target for each of the multiple time periods;
   computing, for each developer entity of a plurality of developer entities for each external dependency target of the plurality of external dependency targets and for each of the multiple time periods, respective values of an external dependency attribution metric, wherein the external dependency attribution metric is a raw count of external dependency introductions for the external dependency target, a raw count of external dependency removals for the external dependency target, a net count of external dependency introductions for the external dependency target, or a sum of external dependency activity for the external dependency target;
   generating an interactive graphical user interface presentation that presents, for each external dependency target, a representation of change over time of values of the aggregated external dependency attribution metric computed for the external dependency target;
   receiving, from a user device presenting the interactive graphical user interface presentation, a user selection within the interactive graphical user interface presentation of a representation of a particular external dependency target of the plurality of external dependency targets;
   obtaining, for each of a plurality of developer entities who introduced or removed external dependencies for the particular external dependency target corresponding to the user selection, respective values of the external dependency attribution metric;
   generating a ranking of the plurality of developer entities who introduced or removed external dependencies for the particular external dependency target based on the respective computed values of the external dependency attribution metric for the plurality of developer entities; and
   in response to receiving the user selection, updating the interactive graphical user interface presentation to present a plurality of highest-ranked developer entities for the external dependency attribution metric for the particular external dependency target based on the generated ranking.

2. The method of claim 1, wherein attributing the introduction or removal of one or more external dependencies on the external dependency target to a developer entity responsible for the child snapshot comprises: attributing, to a developer entity responsible for the child snapshot, an introduction of one or more external dependencies on the external dependency target whenever the first count of external dependencies on the external dependency target in the child snapshot is greater than the second count of external dependencies on the external dependency target in the parent snapshot.

3. The method of claim 1, wherein attributing the introduction or removal of one or more external dependencies on the external dependency target to a developer entity responsible for the child snapshot comprises: attributing, to a developer entity responsible for the child snapshot, a removal of one or more external dependencies on the external dependency target whenever the first count of external dependencies on the external dependency target in the child snapshot is less than the second count of external dependencies on the external dependency target in the parent snapshot.

4. The method of claim 1, wherein each external dependency target comprises one or more different external software modules.

5. The method of claim 1, wherein the representation of change over time of the values of the aggregated external dependency attribution metric for each external dependency target comprises a line graph having one line for each external dependency target of the plurality of external dependency targets.

6. The method of claim 5, wherein receiving, within the interactive graphical user interface presentation, a user selection of a displayed representation of a particular external dependency target of the plurality of external dependency targets comprises receiving a user selection that selects a line in the line graph representing the particular external dependency target.

7. The method of claim 1, further comprising updating the interactive graphical user interface presentation to present, in association with each developer entity of the plurality of highest-ranked developer entities, a respective value of the external dependency attribution metric for the developer entity.

8. A system comprising:
one or more computers and one or more storage devices storing instructions that are operable, when executed by the one or more computers, to cause the one or more computers to perform operations comprising:
receiving data representing a plurality of snapshots of a software project;
receiving data representing a plurality of external dependency targets, each external dependency target being a target of one or more external dependencies occurring in one or more of the plurality of snapshots of the software project;
processing each pair of snapshots of the plurality of snapshots that have a parent/child relationship in a revision graph of the software project, each pair of snapshots having a child snapshot and a parent snapshot, including, for each child snapshot and each parent snapshot of each pair of snapshots, performing operations comprising:
identifying one or more pairs of matching source code files, each pair of matching source code files including a first file of the parent snapshot and a second file of the child snapshot;
for each first file and each second file of each pair of matching source code files, and for each external dependency target of the plurality of external dependency targets:
computing a respective first count of external dependencies on the external dependency target in the first file and a respective second count of external dependencies on the external dependency target in the second file;
determining whether the first count of external dependencies on the external dependency target in the child snapshot is different than the second count of external dependencies on the external dependency target in the parent snapshot; and
whenever the first count of external dependencies on the external dependency target in the child snapshot is different than the second count of external dependencies on the external dependency target in the parent snapshot, attributing, to a developer entity responsible for the child snapshot, an external dependency introduction or an external dependency removal of one or more external dependencies on the external dependency target in the second file of the pair of matching source code files;
computing, for each external dependency target of the plurality of external dependency targets for each of multiple time periods, a respective value of an aggregated external dependency attribution metric based on attributed external dependency introductions, attributed external dependency removals, or both, for the external dependency target for each of the multiple time periods;
computing, for each developer entity of a plurality of developer entities for each external dependency target of the plurality of external dependency targets and for each of the multiple time periods, respective values of an external dependency attribution metric, wherein the external dependency attribution metric is a raw count of external dependency introductions for the external dependency target, a raw count of external dependency removals for the external dependency target, a net count of external dependency introductions for the external dependency target, or a sum of external dependency activity for the external dependency target;
generating an interactive graphical user interface presentation that presents, for each external dependency target, a representation of change over time of values of the aggregated external dependency attribution metric computed for the external dependency target;
receiving, from a user device presenting the interactive graphical user interface presentation, a user selection within the interactive graphical user interface presentation of a representation of a particular external dependency target of the plurality of external dependency targets;
obtaining, for each of a plurality of developer entities who introduced or removed external dependencies for the particular external dependency target corresponding to the user selection, respective values of the external dependency attribution metric;
generating a ranking of the plurality of developer entities who introduced or removed external dependencies for the particular external dependency target based on the respective computed values of the external dependency attribution metric for the plurality of developer entities; and
in response to receiving the user selection, updating the interactive graphical user interface presentation to present a plurality of highest-ranked developer entities for the external dependency attribution metric for the particular external dependency target based on the generated ranking.

9. The system of claim 8, wherein attributing the introduction or removal of one or more external dependencies on the external dependency target to a developer entity responsible for the child snapshot comprises: attributing, to a developer entity responsible for the child snapshot, an introduction of one or more external dependencies on the external dependency target whenever the first count of external dependencies on the external dependency target in the child snapshot is greater than the second count of external dependencies on the external dependency target in the parent snapshot.

10. The system of claim 8, wherein attributing the introduction or removal of one or more external dependencies on the external dependency target to a developer entity responsible for the child snapshot comprises:
   attributing, to a developer entity responsible for the child snapshot, a removal of one or more external dependencies on the external dependency target whenever the first count of external dependencies on the external dependency target in the child snapshot is less than the second count of external dependencies on the external dependency target in the parent snapshot.

11. The system of claim 8, wherein each external dependency target comprises one or more different external software modules.

12. The system of claim 8, wherein the operations further comprise updating the interactive graphical user interface presentation to present, in association with each developer entity of the plurality of highest-ranked developer entities, a respective value of the external dependency attribution metric for the developer entity.

13. The system of claim 8, wherein the representation of change over time of the values of the aggregated external dependency attribution metric for each external dependency target comprises a line graph having one line for each external dependency target of the plurality of external dependency targets.

14. The system of claim 13, wherein receiving, within the interactive graphical user interface presentation, a user selection of a displayed representation of a particular external dependency target of the plurality of external dependency targets comprises receiving a user selection that selects a line in the line graph representing the particular external dependency target.

15. A computer program product, encoded on one or more non-transitory computer storage media, comprising instructions that when executed by one or more computers cause the one or more computers to perform operations comprising:
   receiving data representing a plurality of snapshots of a software project;
   receiving data representing a plurality of external dependency targets, each external dependency target being a target of one or more external dependencies occurring in one or more of the plurality of snapshots of the software project;
   processing each pair of snapshots of the plurality of snapshots that have a parent/child relationship in a revision graph of the software project, each pair of snapshots having a child snapshot and a parent snapshot, including, for each child snapshot and each parent snapshot of each pair of snapshots, performing operations comprising:
      identifying one or more pairs of matching source code files, each pair of matching source code files including a first file of the parent snapshot and a second file of the child snapshot;
      for each first file and each second file of each pair of matching source code files, and for each external dependency target of the plurality of external dependency targets:
         computing a respective first count of external dependencies on the external dependency target in the first file and a respective second count of external dependencies on the external dependency target in the second file;
         determining whether the first count of external dependencies on the external dependency target in the child snapshot is different than the second count of external dependencies on the external dependency target in the parent snapshot; and
         whenever the first count of external dependencies on the external dependency target in the child snapshot is different than the second count of external dependencies on the external dependency target in the parent snapshot, attributing, to a developer entity responsible for the child snapshot, an external dependency introduction or an external dependency removal of one or more external dependencies on the external dependency target in the second file of the pair of matching source code files;
   computing, for each external dependency target of the plurality of external dependency targets for each of multiple time periods, a respective value of an aggregated external dependency attribution metric based on attributed external dependency introductions, attributed external dependency removals, or both, for the external dependency target for each of the multiple time periods;
   computing, for each developer entity of a plurality of developer entities for each external dependency target of the plurality of external dependency targets and for each of the multiple time periods, respective values of an external dependency attribution metric, wherein the external dependency attribution metric is a raw count of external dependency introductions for the external dependency target, a raw count of external dependency removals for the external dependency target, a net count of external dependency introductions for the external dependency target, or a sum of external dependency activity for the external dependency target;
   generating an interactive graphical user interface presentation that presents, for each external dependency target, a representation of change over time of values of the aggregated external dependency attribution metric computed for the external dependency target;
   receiving, from a user device presenting the interactive graphical user interface presentation, a user selection within the interactive graphical user interface presentation of a representation of a particular external dependency target of the plurality of external dependency targets;
   obtaining, for each of a plurality of developer entities who introduced or removed external dependencies for the particular external dependency target corresponding to the user selection, respective values of the external dependency attribution metric;
   generating a ranking of the plurality of developer entities who introduced or removed external dependencies for the particular external dependency target based on the respective computed values of the external dependency attribution metric for the plurality of developer entities; and in response to receiving the user selection, updating the interactive graphical user interface presentation to present a plurality of highest-ranked developer entities for the external dependency attribution metric for the particular external dependency target based on the generated ranking.

16. The computer program product of claim 15, wherein attributing the introduction or removal of one or more external dependencies on the external dependency target to a developer entity responsible for the child snapshot comprises:

attributing, to a developer entity responsible for the child snapshot, an introduction of one or more external dependencies on the external dependency target whenever the first count of external dependencies on the external dependency target in the child snapshot is greater than the second count of external dependencies on the external dependency target in the parent snapshot.

17. The computer program product of claim 15, wherein attributing the introduction or removal of one or more external dependencies on the external dependency target to a developer entity responsible for the child snapshot comprises:

attributing, to a developer entity responsible for the child snapshot, a removal of one or more external dependencies on the external dependency target whenever the first count of external dependencies on the external dependency target in the child snapshot is less than the second count of external dependencies on the external dependency target in the parent snapshot.

18. The computer program product of claim 15, wherein each external dependency target comprises one or more different external software modules.

19. The computer program product of claim 15, wherein the operations further comprise updating the interactive graphical user interface presentation to present, in association with each developer entity of the plurality of highest-ranked developer entities, a respective value of the external dependency attribution metric for the developer entity.

20. The computer program product of claim 15, wherein the representation of change over time of the values of the aggregated external dependency attribution metric for each external dependency target comprises a line graph having one line for each external dependency target of the plurality of external dependency targets.

21. The computer program product of claim 20, wherein receiving, within the interactive graphical user interface presentation, a user selection of a displayed representation of a particular external dependency target of the plurality of external dependency targets comprises receiving a user selection that selects a line in the line graph representing the particular external dependency target.

* * * * *

UNITED STATES PATENT AND TRADEMARK OFFICE
CERTIFICATE OF CORRECTION

| | |
|---|---|
| PATENT NO. | : 9,785,421 B1 |
| APPLICATION NO. | : 15/476578 |
| DATED | : October 10, 2017 |
| INVENTOR(S) | : Robin Neatherway |

Page 1 of 1

It is certified that error appears in the above-identified patent and that said Letters Patent is hereby corrected as shown below:

In the Claims

Column 20, Line 8, in Claim 1, after "responsible for" delete "of".

Signed and Sealed this
Twenty-seventh Day of March, 2018

Andrei Iancu
*Director of the United States Patent and Trademark Office*